Aug. 27, 1963   E. R. RISH   3,101,553
PARALLEL GAUGE

Filed May 18, 1961   2 Sheets-Sheet 1

Ervin R. Rish
INVENTOR.

BY *Clarence A. O'Brien*
*and Harvey B. Jacobson*
Attorneys

Aug. 27, 1963    E. R. RISH    3,101,553
PARALLEL GAUGE
Filed May 18, 1961    2 Sheets-Sheet 2

Ervin R. Rish
INVENTOR.

BY Clarence A. O'Brien
and Harvey B. Jackson
Attorneys

United States Patent Office 3,101,553
Patented Aug. 27, 1963

3,101,553
PARALLEL GAUGE
Ervin R. Rish, Valdosta, Ga.
(1815 8th St., Cayce, S.C.)
Filed May 18, 1961, Ser. No. 111,105
5 Claims. (Cl. 33—203.18)

This invention relates to alignment devices, and more particularly to devices for detecting and correcting conditions of misalignment which cause excessive wear on rollers, rails, idlers and sprockets on crawler tractors.

Briefly, the invention comprises a gauge which includes a series of bars so connected together as to indicate the angle of idler pulley or roller for a track or chain in relation to the roller frame in either a vertical or horizontal plane, and is so designed that it can be attached to and removed from the roller frame very rapidly.

Accordingly, it is the primary object of this invention to provide a device for detaching and correcting a condition of misalignment between a track roller and the track carried on the roller. This is determined by detecting the change in angle or the misalignment between an edge of the roller and the frame on which it is mounted.

It is another object of the invention to provide a gauge which can be very rapidly detached and attached to the frame on which a roller is mounted for determining the degree of misalignment, if any, of the roller in relation to the frame.

It is still another object of the invention to provide a gauge whose parts are swivelly connected so that various parts of the gauge may be rotated or swivelled whereby the gauge may be used for determining the misalignment of rollers at various locations on a vehicle or machine.

It has been commonly thought that the primary cause of wear of the tracks and idler rollers of crawler tractors is due to operating the crawler on slopes so as to create what is commonly known as side loading. However, I have found that this is not true, and the real cause for most of the wear between the track and idler rollers of a crawler is caused by inadvertent misalignment between the rollers and the track. This misalignment may be caused by wear, undue strain, and other causes, and the owner and operator of the crawler is normally not aware of the existence of such misalignment.

Accordingly, it is the primary object of this invention to provide a gauge for rapidly determining the degree of misalignment between the tracks and supporting rollers on crawler tractors.

In crawler tractors, it is apparent that if the track rollers are properly aligned with the track, that the rails of the track will never touch either the roller flanges or the center crown on the idler rollers except in tight turns. When the tracks and rollers are so aligned, very little wear will occur therebetween.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
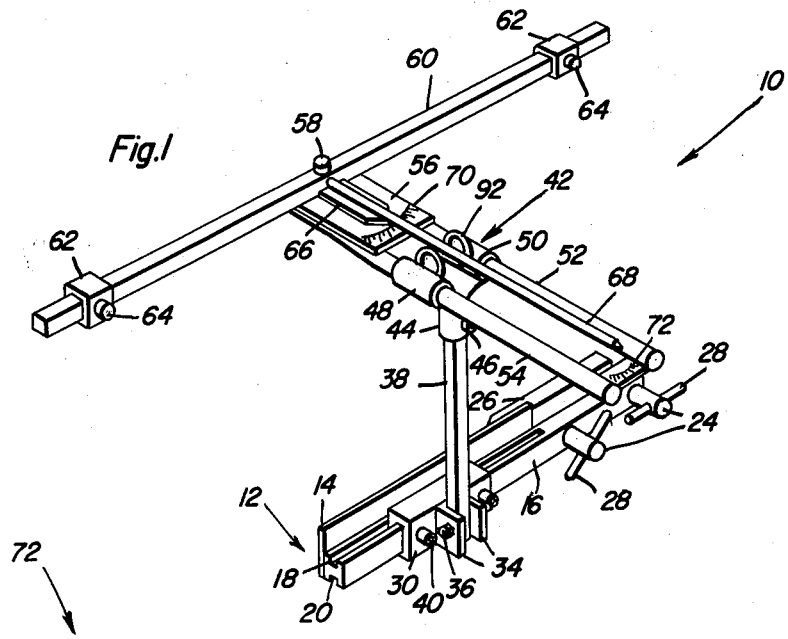
FIGURE 1 is a perspective view of my assembled gauge.

Referring to the drawings, it can be seen that my parallel gauge 10 comprises a mounting device 12. The mounting device 12 includes a pressure plate 14 of rectangular shape rigidly fixed to a rail bar 16 which is of rectangular cross section and has upper and lower rectangular grooves 18 and 20 formed in one end thereof so as to cause the rail bar to have an H-shaped cross-section in the end where the grooves are provided. The end of the bar 16 opposite the groove end has two relatively large bores therein which rotatably receive the reduced shanks of parallel studs 24. The shanks 22 are threaded and extend into and mate with threaded bores in clamping block 26. Each of the studs 24 have rods 28 extending through their head ends so as to form handles for rotating the studs. When the studs 24 are rotated, they do not move axially in relation to the rail bar 16, but do move the clamping block 26 either toward or away from the rail.

A guide block 30 which is substantially C-shaped in cross-section has spaced and parallel flanges 32 extending into the grooves 18 and 20 so as to slidably support the guide block on the rail 16. The back side of the guide has projecting outwardly therefrom two spaced and parallel ears 34 which have aligned bores that receive a threaded nut and bolt pivot means 36. An arm 38 extends between the ears 34 and has a bore in its lower end through which extends the pivot bolt 36. The block 30 may be reciprocated back and forth along the rail 16 and is locked thereto by means of two setscrews 40.

Slidably mounted on the upper end of the arm 38 is a support 42 of generally T-shape. The stem of the T comprises a hollow tubular portion 44 slidable on the arm 38 and locked thereto by means of a setscrew 46. The support member 42 has two parallel tubular guides 48 and 50 which slidably support the parallel circular rods 52 and 54 in a position whereby they are substantially normal to the arm 38. The rods 52 and 54 have a pair of adjacent ends which are fixed together by means of an indicator plate 56 welded thereto.

The outer end of the indicator plate 56 has a bore extending therethrough and between the rods 52 and 54. Supported on the upper surface of the plate 56 and pivotally connected thereto by means of a pin 58 is an alignment bar 60 which is preferably accurately machined and has slidable on each end thereof accurately machined alignment blocks 62 which may be secured in any desired position to the alignment bar by means of setscrews 64.

Fixed to the central side portion of the alignment bar 60 are two indicating pointers 66 and 68. The indicator 66 points to a dial 70 on the plates 56 while the indicator 68 points to a dial 72 on a plate which is secured between the ends of the rods 54 and 52 opposite the plate 56.

The rods 52 and 54 may either be fixed to the tubular guide 48 or 50, or they may be slidable therein and adjustably locked thereto by means of setscrews, not shown.

A crawler or Caterpillar tractor 72 has a longitudinally extending frame member 74 which is generally parallel to the ground or horizontal. The frame member 74 has fixed to its upper surface a beam 76 of hollow box-like construction, and fixed to the end of the beam and to the upper end surface of the frame member 74 is a conventional bearing support 78 which rotatably supports a roller or idler shaft 80 in a position perpendicular to the longitudinal axis of the frame 74. The track idler wheel 82 is rotatable on the axle 80 and supports and guides a conventional link type hollow track 84 composed of a plurality of links 86 pivotally connected at 88. The bearing support 78 is adjustable back and forth along the upper surface of the frame member 74, and this is permitted by means of the adjustment studs 90.

Figure 4:
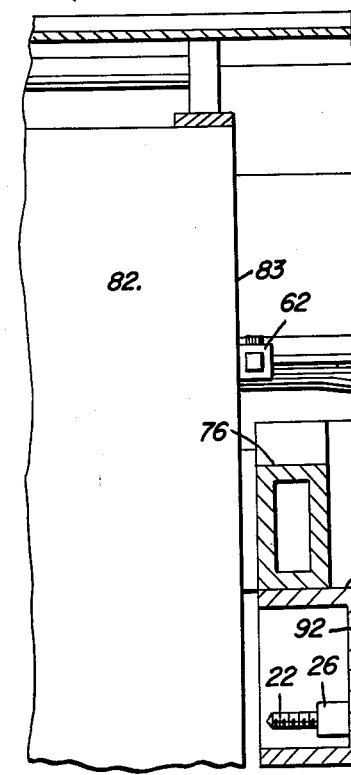
FIGURE 4 is a cross sectional vertical view taken substantially on the plane of line 4—4 in FIGURE 2.
Figure 2:
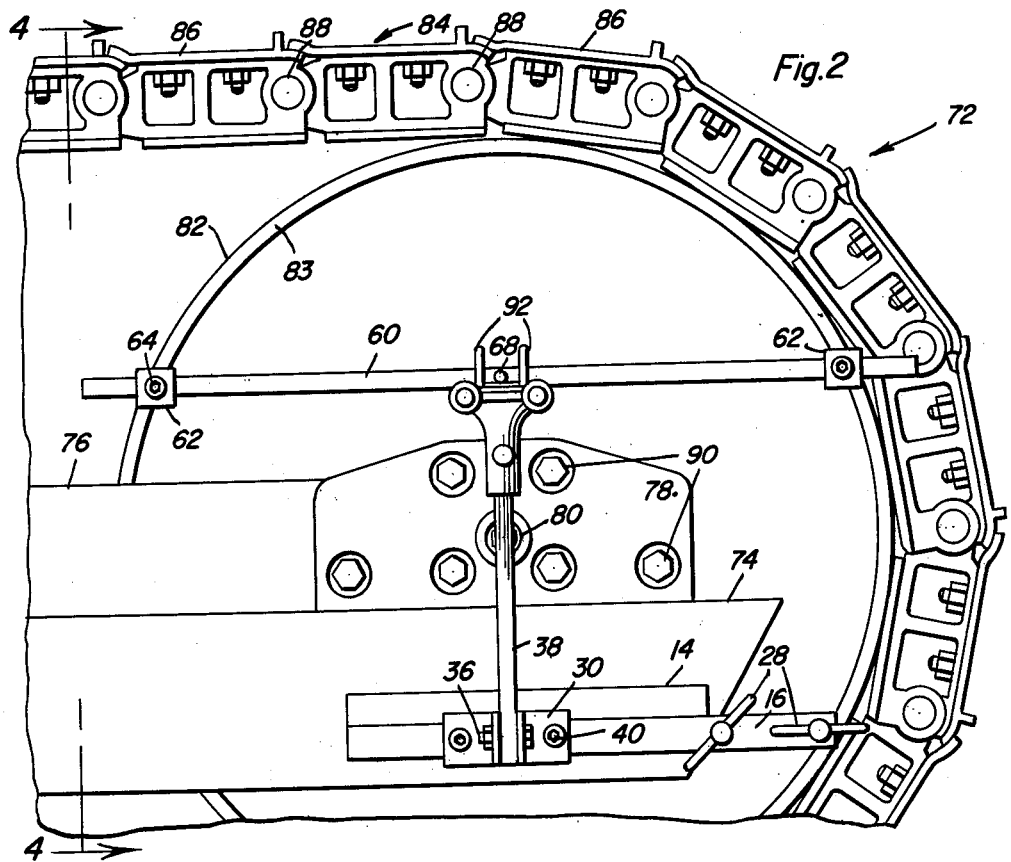
FIGURE 2 is a side elevational view showing the gauge installed on a frame of a crawler tractor for properly determining the alignment of an idler roller.
Figure 3:
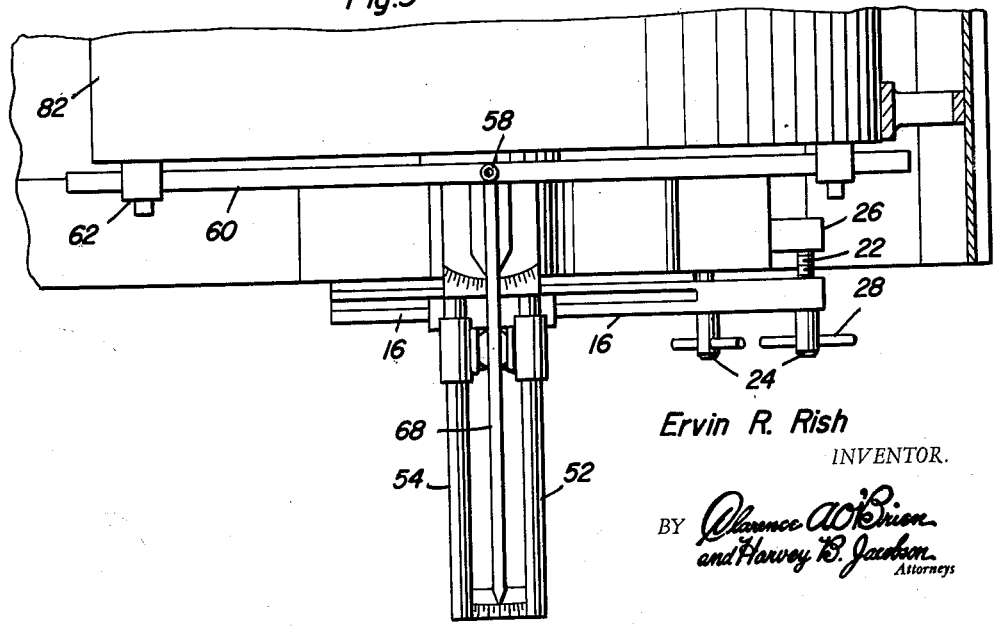
FIGURE 3 is a plan view of the structure shown in FIGURE 2.

Due to wear, undue strain, factory tolerances, etc., the axle 80 often becomes misaligned where it no longer holds the idler, which it carries at right angles, 90 degrees, in the vertical plane or parallel in the horizontal plane. Misalignment in either plane causes undue wear on component parts; but since the track is several feet in length, the horizontal alignment is especially critical. The track will naturally attempt to follow a straight line in relation to a center line drawn through the idler. Therefore, a very small amount of toe-in or toe-out result in a terrific amount of scrubbing action between the rails and the roller flanges. My parallel gauge device 10 very readily determines whether or not the axle 80 and its roller 82 are out of alignment with the frame and track. This is accomplished by placing the pressure plate 14 adjacent the outer surface of the frame 74 and parallel to its upper and lower edges. The studs 22 are then loosened by means of the handles 28 so as to separate the clamping block 26 from the pressure plate 14 a sufficient distance to insert the wall 92 of the frame member 74 between the block and pressure plate as shown in FIGURE 4. The studs 24 are then rotated by handles 28 so as to draw the block 26 and plate 14 together thereby clamping the frame tightly therebetween for securing the parallel gauge thereto.

The guide block 30 is then slid longitudinally along the rail 16 until it is directly below the axle 80, and then is locked in place by means of the setscrews 40. The arm 38 is then pivoted about the ball 36 in an upward direction until the bar 60 is substantially adjacent the outer edge of the rim of the idler wheel 82. The alignment blocks 62 are then slipped along the alignment bar 60 until they are adjacent the rim 83 of the idler 82, and then are locked in place by means of setscrews 64.

The alignment blocks 62 are both forced against the edge of the rim 83 by pivoting the alignment bar 60 about the pivot point 58. If the indicating pointers 68 and 66 point to zero or to the center of the dials 70 and 72, then this indicates that the axle 80 and the roller 28 are properly in alignment with the frame 74 and the track 84. However, if the pointers do not point to zero, then they indicate that the axle 80 and idler wheel 82 are not in proper alignment. The dials 70 and 72 are preferably scaled so as to indicate the degrees and minutes by which the axle 80 is out of alignment. For example, the dial 70 may be calibrated in degrees while the dial 72 may be calibrated in minutes.

The T-shaped support 42 has two rings 92 fixed to its upper surface in alignment with each other. These rings may function as carrying handles and are particularly effective since they are located substantially over the center of gravity of the parallel gauge 10.

It is to be noted that the support 42 is vertically slidable on the arm 38 and the rods 52 and 54 are slidable in the tubular guides 48 and 50 so that the gauge may be properly adjusted for any type of crawler. Also, while the gauge has been illustrated as installed on the right end of the frame 74, it is apparent that this gauge can also be installed on the left end of the frame 74 merely by rotating the rail bar 16 180° about a horizontal axis extending normal thereto and rotating the arm 38 180° about the pin 36, and withdrawing the rods 54 and 52 from the tubular guides 48 and 50 and reinserting them in the opposite sides of these guides.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A parallel gauge for determining the degree of toe in and toe out of a wheel in relation to the frame upon which it is mounted comprising a support, securing means for attaching the support to the frame, an arm connected to the support, an alignment bar generally normal to said arm, connecting means movably connecting the alignment bar to said arm, indicating means connected to said alignment bar for indicating the degree of toe in and toe out when said bar is aligned with the wheel, said arm being connected to said support by a pivot pin perpendicular to the arm.

2. A parallel gauge for determining the degree of toe in and toe out of a wheel in relation to the frame upon which it is mounted comprising a support, securing means for attaching the support to the frame, an arm connected to the support, an alignment bar generally normal to said arm, connecting means movably connecting the alignment bar to said arm, indicating means connected to said alignment bar for indicating the degree of toe in and toe out when said bar is aligned with the wheel, said arm being connected to said support by a pivot pin perpendicular to the arm, and a block slidable on said support in a direction parallel to said pivot pin, said pivot pin connecting the arm to the block.

3. A parallel gauge for determining the degree of toe in and toe out of a wheel in relation to the frame upon which it is mounted comprising a support, securing means for attaching the support to the frame, an arm connected to the support, an alignment bar generally normal to said arm, connecting means movably connecting the alignment bar to said arm, indicating means connected to said alignment bar for indicating the degree of toe in and toe out when said bar is aligned with the wheel, said connecting means including a pivot axis for the bar parallel to said arm, said arm being connected to said support by a pivot pin perpendicular to the arm.

4. A parallel gauge for determining the degree of toe in and toe out of a wheel in relation to the frame upon which it is mounted comprising a support, securing means for attaching the support to the frame, an arm connected to the support, an alignment bar generally normal to said arm, connecting means movably connecting the alignment bar to said arm, indicating means connected to said alignment bar for indicating the degree of toe in and toe out when said bar is aligned with the wheel, said connecting means including a pivot axis for the bar parallel to said arm, and a member slidably supported by said arm in a position perpendicular thereto, said pivot axis being carried by said member, and a block slidable on said support in a direction parallel to said pivot pin, said pivot pin connecting the arm to the block, said securing means including a clamping block and threaded pins adjustably connecting the clamping block to the support.

5. In combination, a longitudinal frame, an axle supported on said frame and generally perpendicular thereto, a wheel journalled for rotation on said axle, an endless track carried around the wheel, a parallel gauge for determining the misalignment of the wheel in relation to the frame comprising a support, securing means for attaching the support to the frame, an arm connected to the support, an alignment bar generally normal to said arm, connecting means movably connecting the alignment bar to said arm, indicating means connected to said alignment bar for indicating the degree of toe in and toe out when said bar is aligned with the wheel, said arm being connected to said support by a pivot pin perpendicular to the arm, and a block slidable on said support in a direction parallel to said pivot pin, said pivot pin connecting the arm to the block.

References Cited in the file of this patent
UNITED STATES PATENTS

| | | |
|---|---|---|
| 2,115,347 | Sutton | Apr. 26, 1938 |
| 2,845,718 | Keymer | Aug. 5, 1958 |

FOREIGN PATENTS

| | | |
|---|---|---|
| 62,650 | Norway | July 1, 1940 |